July 12, 1932.  C. W. EBELING  1,866,528
SOUND HEAD FOR SOUND-ON-FILM MECHANISM
Filed March 31, 1930    2 Sheets-Sheet 1
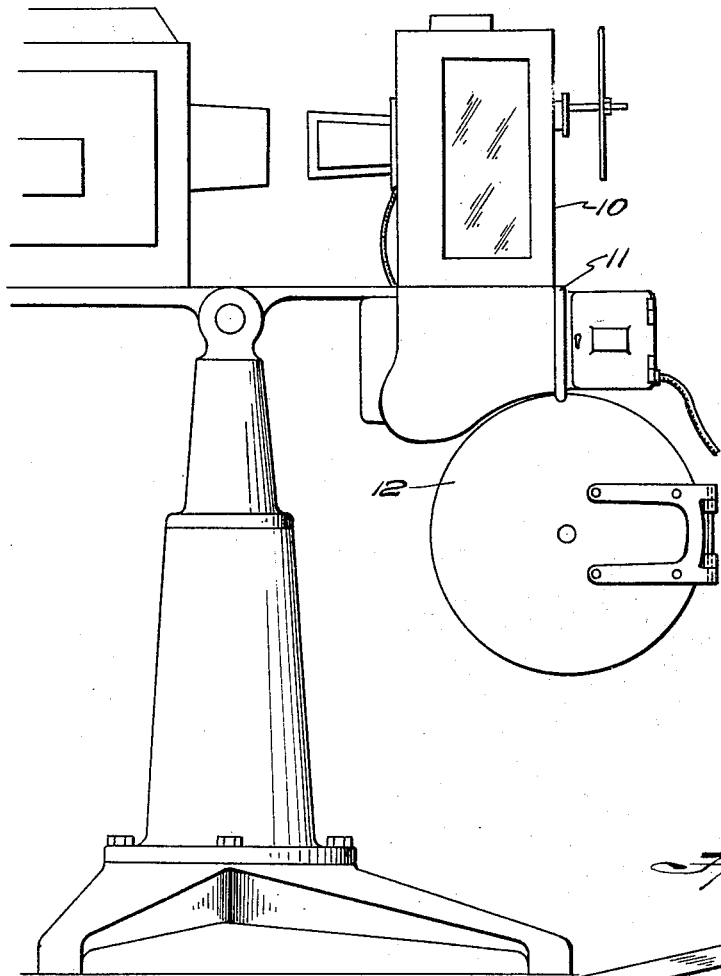
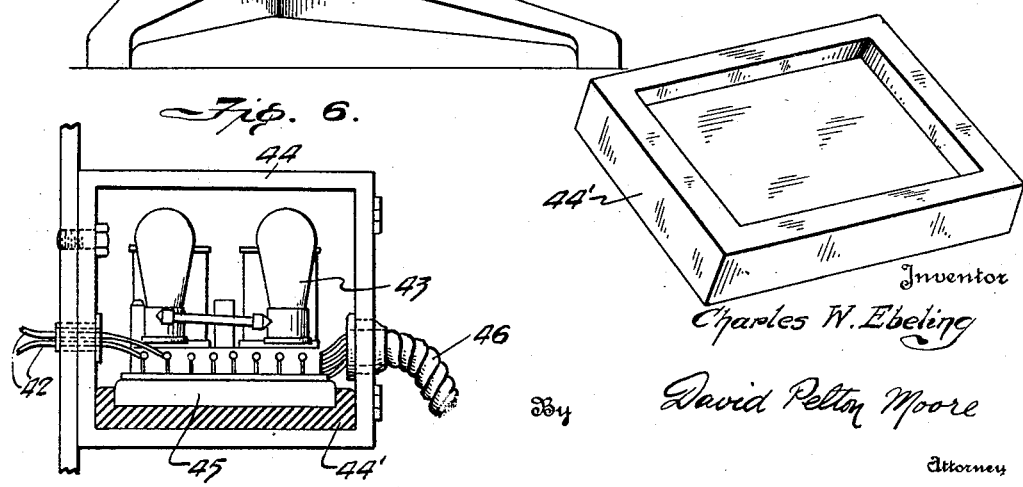

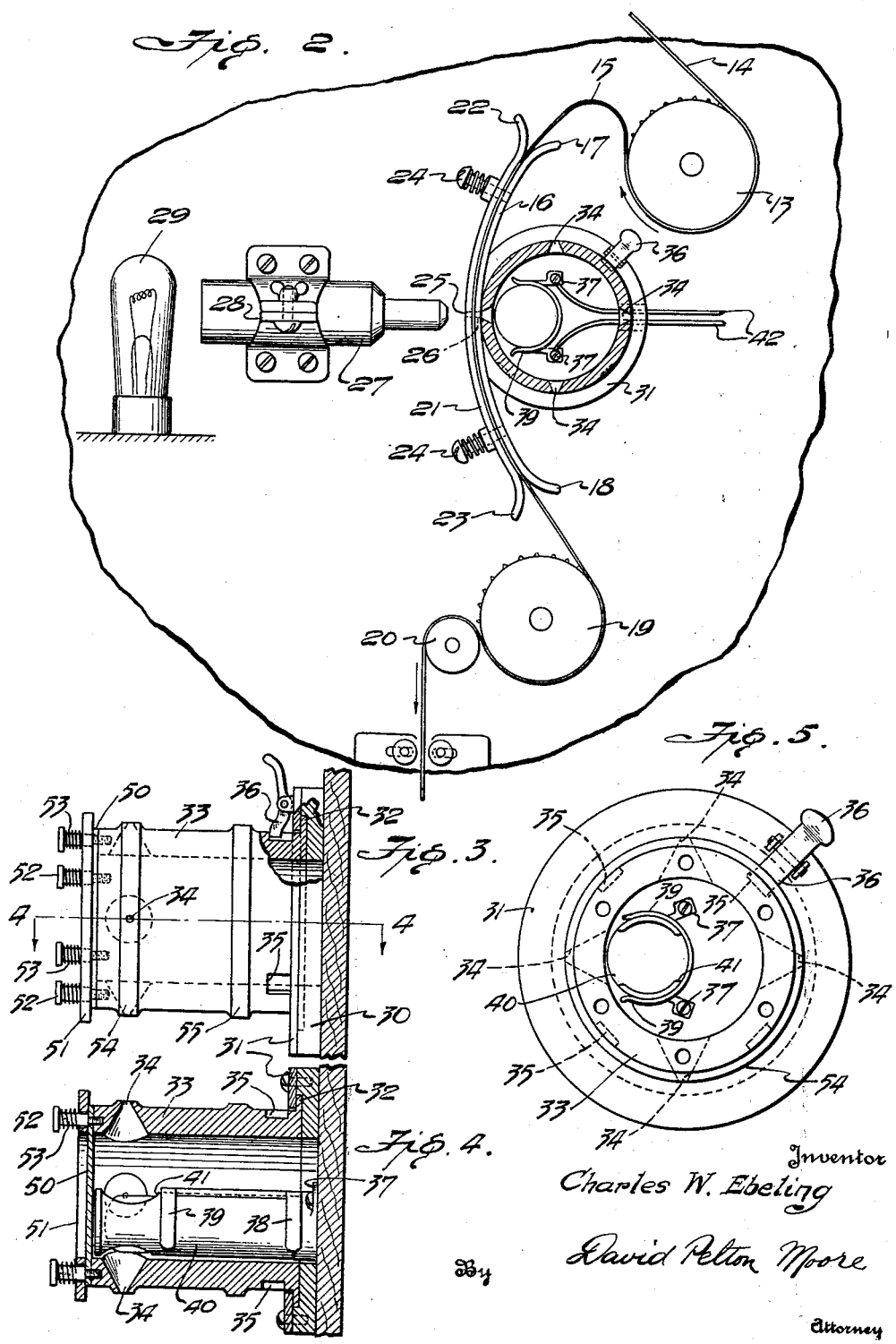

Patented July 12, 1932

1,866,528

UNITED STATES PATENT OFFICE

CHARLES W. EBELING, OF NEW YORK, N. Y., ASSIGNOR TO GENERAL TALKING PICTURES CORPORATION, OF NEW YORK, N. Y., A CORPORATION OF DELAWARE

SOUND HEAD FOR SOUND-ON-FILM MECHANISM

Application filed March 31, 1930. Serial No. 440,589.

The present invention relates to improvements in sound heads for sound-on-film mechanism, one object of the invention being the provision of an arrangement whereby the photo electric cell is placed in closer proximity to the film to thereby insure the greatest possible efficiency in the effect of a light upon the cell and the consequent effect of the cell upon the amplifying system.

Another object of this invention is the provision of a sound head in which a photo electric cell amplifier is closely associated with the photo electric cell and so mounted as to be affected to the least degree by external vibrations caused by the film advancing mechanism of the sound head and motion picture projector.

Still another object of this invention is the provision of an adjustable slit block provided with a plurality of slits and readily adjustable so that one slit at a time may be positioned for alignment with the optical system and photo electric cell, said slit block being so constructed as to accommodate the photo electric cell to bring the same into closer proximity to the slit of the block.

Still another object of this invention is the provision of a peculiar construction of film guiding means interposed between the lowest sprocket of the motion picture projector and the constant speed sprocket of the sound head and adjacent the optical system and slit block whereby the film is permitted the necessary movement without undue wear thereon and yet is held in close proximity to the slit of the block so that there is no possible chance of an extra space being provided at this point, thus produce the best possible sound reproducing and the elimination entirely of ground and microphonic noises due in part to the slight buckling or spacing of the film when passing the slit and the photo electric cell.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawings,

Figure 1 is a view in side elevation of a well-known form of motion picture projector having mounted in connection therewith the present sound head showing the relative position of the lower film reel magazine and the motion picture film advancing mechanism.

Figure 2 is an enlarged detailed view of the sound head per se, showing the interior mechanism and the relative position of the optical system and adjacent parts.

Figure 3 is a plan view of the slit block and adjacent portion of the sound head, parts in Figure 4 being a section taken on line 4—4 in Figure 3.

Figure 5 is an enlarged view in end elevation of the slit block showing the position of the photo electric cell there within.

Figure 6 is an enlarged detailed view of the casing, elastic mount and a view of one form of photo electric cell amplifier.

Figure 7 is a perspective view of the rubber mount for said amplifier.

Referring to drawings:

The numeral 10 designates the main casing of a motion picture projector in which is mounted the usual film advancing means (not shown), and disposed below the same and attached in any desired manner so as to form a continuation of the casing 10 is a sound head 11 and attached thereto and depending therefrom is a lower reel magazine 12.

The lower sprocket 13 of the motion picture film advancing mechanism as clearly illustrated in Figure 2 receives the film 14, the same being directed therefrom around to form a loop 15 and is then passed over a curved or segmental guiding plate 16 which is provided with inwardly or curved guiding ends 17 and 18 so as to present no sharp edges to the film and permit the same to be properly guided to and around a constant speed sprocket 19 and over an idler 20 and thence to the lower magazine. Associated with the curved plate 16 is a curved guiding plate 21 having the outwardly curved ends 22 and 23 to prevent the cutting of the film and to assist in the easy assembling of the film between the plates 16 and 21 when the film is placed in the present mechanism. This plate 21 is held resiliently in contact or toward the plate 16 by means of two spring held screws 24 as clearly illustrated in Figure 2. Apertures 25 and 26 are provided in the plates 16 and 21 and are in alignment with the inner end of the optical system 27, which system is adjustably mounted in a clip 28 mounted in the sound head and aligned with the filament of the exciter lamp 29. Thus it will be seen that the light from the filament is focused or directed through the apertures 26 and 25 and upon the film 15 at this point. In practise it has been found that to secure the best possible results the film must be held in exceedingly close contact or taut when passing the optical system so that no wavering action or any extra space be provided that would permit the defusing, spreading or haloing of the light which effect invariably produces microphonic or ground noises. It is also essential that the photo electric cell be placed in as close proximity to the opposite face of the film as can be secured so that there is no division of the light but a direct projection thereof into and upon the elements of the cell.

To this end there is provided a supporting annular rim or member 30 attached to the casing of the sound box and provided with an annular member 31 by means of which the flange 32 of the cylindrical slit block 33 is securely held in place but permitted rotation. This slit block as illustrated is provided with four apertures or slits 34 and either one of these is aligned at a time with the apertures 25 and 26 of the plates 16 and 21, there being provided a plurality of notches 35 in the slit block for the reception of the manually actuated catch 36. By this means the catch may be manipulated to release the slit block for adjustment and the slit block may be adjusted or rotated to place any one of the slits 34 in proper alignment and by release of the catch 36 permitting locking of the slit block against accidental displacement.

By this means should the slit being used become clogged it is merely necessary to manipulate the catch 36 and place in position either one of the remaining slits 34, and further as the member or slit block 33 is a relatively large cylinder and open at its inner end the clogged opening may be readily cleaned at leisure.

Disposed upon the casing of the sound head and within the hollow portion of the slit block 33 are a pair of spring clips 37 provided with the spring tension impressing terminals 38 and 39 for the removable reception of the photo electric cell 40 which is thus placed eccentric of the slit block 33 with its window or light receiving aperture 41 in close contact with the inner wall of the slit block and adjacent the aperture 34 which is aligned with the optical system. The contacts 37 are in electrical connection through the conductors 42 with the photo electric cell amplifier 43. The latter as illustrated in Figures 1 and 6 is mounted in a casing 44 supported to and from the sound head and thus placed in the closest possible proximity to the photo electric cell to thereby insure the most efficient operation of the cell. Disposed within this casing is a recessed block 44 of sponge rubber, which forms a resultant base or support for the cast iron base 45 of the amplifier 43 and leading from said box 44 is a cable 46 through which the various conductors from the amplifier 43 are directed to the second stage of amplification or to as many stages as may be found proper and desirable.

From the foregoing description taken in connection with the drawings it is evident that with the construction and arrangement of the present type of slit block that the light rays projected from the exciter lamp are most efficiently delivered to the photo electric cell and with the least possible loss due to defusion refraction and/or deflection, thus producing in a sound head of this type the best possible reproduction and with practically no microphonic or ground noises other than those inherent in the photograph deposited or made upon the film. In order that the slit unit 33 may be covered and thus prevent the entering of oil to affect the photo electric cell, there within, an oil-tight cover 50 is provided. There is also connected so as to have a resilient tension toward the edge of the film and bodily carried by the slit unit 33, an annulus or ring 51 which is of slightly greater diameter than the end of the slit unit 33 so as to abut the outer edge of the film and thus hold it resiliently toward the sound head frame, and also to guide the film so that the line of sound wave photographs or sound track will ride on the ridge 54. A second ridge 55 is also provided to receive the film. In order to accomplish this a plurality of screws or bolts 52 attached to the unit support, the ring and slidable springs 53 mounted thereon, and bearing against the ring and the heads of the screws resiliently hold the ring toward the edge of the film.

What I claim is:

1. A sound head for sound-on-film mechanism, including a rotatable slit block having a plurality of circumferentially aligned slits and selective means for adjusting the same to present one slit at a time.

2. The sound head as claimed in claim 1 in which the slit block is substantially cylindrical providing a curved surface to receive the film during sound reproduction.

3. A sound head as claimed in claim 1 in which the wall of the slit block is relatively thin, and an eccentrically mounted photo electric cell within the block and disposed to be aligned with one of the slits thereof at a time and whereby the photo electric cell is positioned in the closest proximity to the slit.

4. A sound head as claimed in claim 1, in which the said slit block is a hollow cylindrical member, an oil-tight cover therefor and a resilient annulus of greater diameter than the cylinder attached to the free end thereof to form a resilient film guide for the block.

5. A sound head as claimed in claim 1 in which the slit block is a hollow cylinder provided with two parallel circumferential ridges and upon which the film engages, the slits of said block being open through one of said ridges and against which the sound track of the film impinges.

6. A sound head as claimed in claim 1 in which the slit block is a hollow cylinder provided with two parallel circumferential ridges and upon which the film engages, the slits of said block being open through one of said ridges and against which the sound track of the film impinges, and an eccentrically mounted photo electric cell disposed within the slit block and adapted to be in close proximity to one slit at a time.

7. A sound head for sound-on-film mechanism including a casing, an exciter lamp, an optical system, a rotatable slit block and film guide provided with a plurality of slits mounted in the casing, means for adjusting and locking the same to align one slit at a time with the optical system and exciter lamp, said slit block being a hollow cylinder, and a photo electric cell mounted within the slit block and in close proximity to the aligned slit.

8. A sound head as claimed in claim 1, in which the slit block constitutes one of the guiding members for the moving film.

9. A sound head as claimed in claim 1 in which the slit block is a hollow cylinder, there is provided upon the circumference of the cylinder a sound track receiving ridge through which the slits are open, and selective means for locking the slit block with one of said slits aligned with the optical system.

10. A sound head for sound-on-film mechanism including a casing, film advancing means mounted therein, a cylindrical combined film guide slit block mounted for rotation in the casing, means for selectively locking the slit block against rotation, a photo electric cell mounted in said slit block, and two co-acting fixed and resiliently movable curved film guiding members associated with the slit block for guiding the film past the slit block upon a curve which tends to hold the film taut and in close contact with the fixed strip to prevent defusion of light through the film.

11. A sound-head for sound-on-film mechanism, including a hollow cylindrical combined film guide and slit-block mounted for rotation and provided with a plurality of circumferentially aligned slits and manually selective means for adjusting the block to present one slit at a time.

In testimony whereof I have hereunto set my hand.

CHARLES W. EBELING.